April 17, 1962 C. OLSON ETAL 3,029,549
SKIVING TOOL
Filed Jan. 15, 1959 2 Sheets-Sheet 1
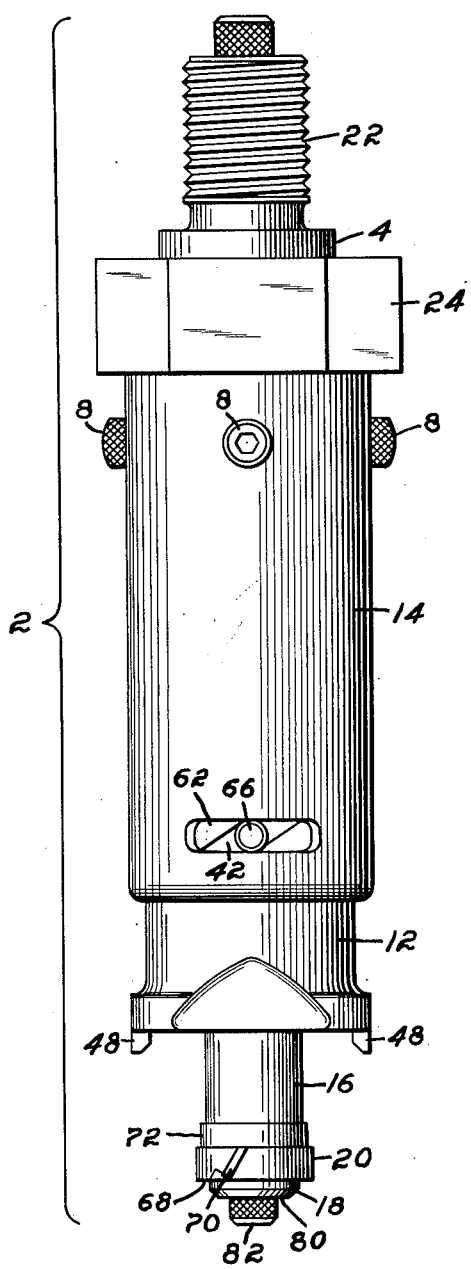
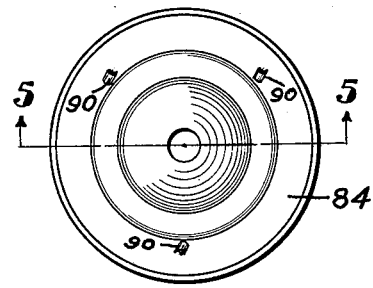
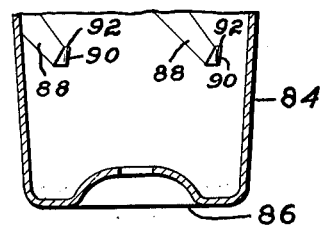
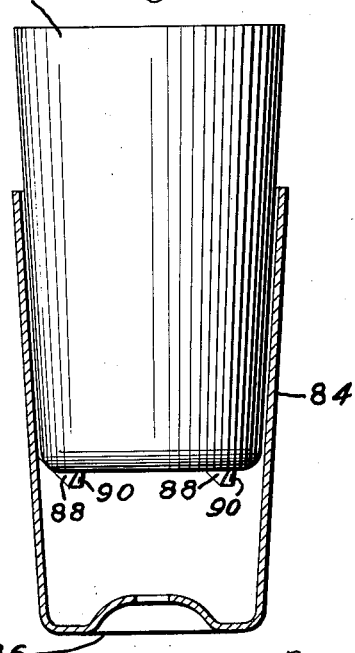
Inventor:
Conrad Olson &
Harold A. Hoadley.
by Walter P. Jones
Atty.

April 17, 1962

C. OLSON ETAL 3,029,549

SKIVING TOOL

Filed Jan. 15, 1959

Inventor:
Conrad Olson &
Harold A. Hoadley.
by Walter P. Jones  Atty.

United States Patent Office 3,029,549
Patented Apr. 17, 1962

3,029,549
SKIVING TOOL
Conrad Olson, Arlington, and Harold A. Hoadley, Medford, Mass., assignors to United-Carr Fastener Corporation, Cambridge, Mass., a corporation of Delaware
Filed Jan. 15, 1959, Ser. No. 786,934
1 Claim. (Cl. 45—137)

This invention relates generally to a process for internally skiving a ferrule or the like and the product produced by said process.

An object of the invention is to diagonally skive a tapered ferrule.

A further object of the invention is to turn the cutter inside the ferrule circumferentially while it is pushed a predetermined distance into the ferrule.

Other objects of the invention will, in part, be obvious, and will, in part, appear hereinafter.

FIG. 1 is a front elevation of the punch assembly in full;

FIG. 4 is a top plan view of the ferrule;

FIG. 5 is a section taken on line 5—5 of FIG. 4; and

FIG. 6 is a front elevation of the nested ferrules or ferrule and one in section.

The use of skiving or stops which project into the ferrule is old in the art. The skiving was used basically to prevent the ferrule from nesting, one in the other, when they are placed in a container either in packing or in finishing operations. In the past, the stop has been skived from the ferrule so that it formed a curl of metal at right angles to the axis of the ferrule as disclosed in the patent to D. W. Clark, Patent No. 2,819,557, issued on January 14, 1958. However, the Clark skiving was unable to withstand horizontal stress. Furthermore, when the ferrule was placed on a wooden furniture leg, the skiving would be sheared off. Applicant's skiving is formed so that the skiving is at an angle to the axis of the ferrule and one of the edges is on a lower plane than the other. This gives the ferrule great strength to resist the horizontal shearing forces mentioned heretofore. It also prevents nesting and because it presents a "cutting" edge to the wood leg on which it is placed cuts into the wood securely holding the ferrule to the leg.

The preferred embodiment of the punch assembly which in this case is designed for use in an eyelet machine (or any other suitable machine) or may be slightly redesigned for use in a pillar press machine, or for that matter in most types of reciprocating machines.

Figure 2:
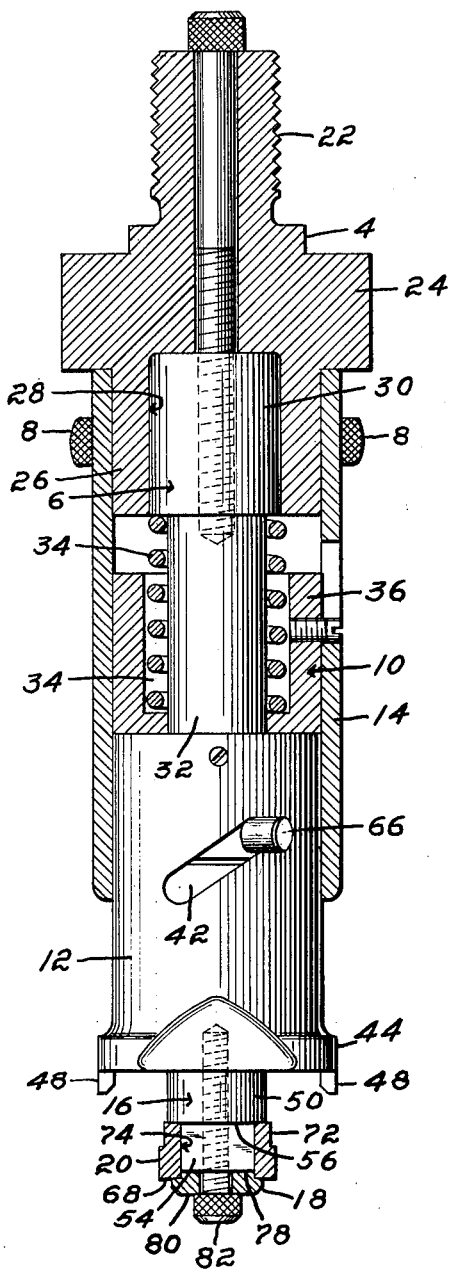
FIG. 2 is a front elevation, partly in section of the punch assembly with the cutter at the bottom of the stroke.
Figure 3:
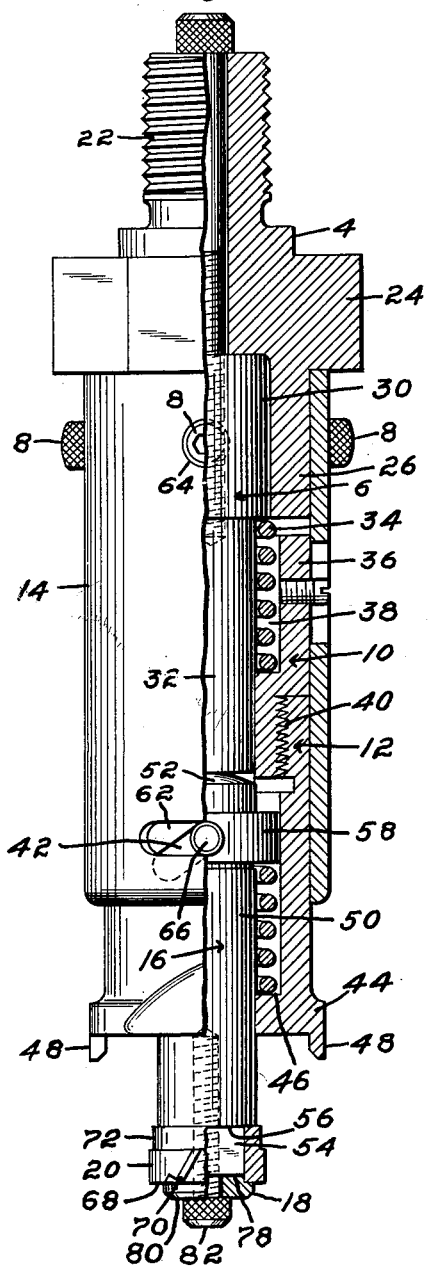
FIG. 3 is the same as FIG. 1 but partly in section.

The drawing illustrates a punch assembly 2 comprising a chuck or head 4, a drive plunger 6, a lock screw 8, a spring container 10, a cam sleeve 12, an outside shell or collar 14, a drive shaft or punch holder 16, a retaining washer 18 and a cutter 20. As best shown in FIGS. 2 and 3, the chuck 4 comprises an integral threaded top portion 22, polygonal shouldered portion 24 and channel portion 26. The channel portion 26 embodies a drive plunger channel 28 bored therein to accommodate a portion of the drive plunger 6. The top portion 22 and the shouldered portion 24 are axially bored to open into the drive plunger channel 28. The drive plunger 6 comprises a plunger head 30 and plunger rod 32, both cylindrical in form with the diameter of the plunger head 30 a predetermined distance greater than the diameter of the plunger rod 32. The plunger head 30 and a short distance of the plunger rod 32 are axially tapped as shown in FIG. 2. To engage the chuck 4 and the drive plunger 6 the plunger head 30 is seated in the drive plunger channel 28 of the chuck 4. A chuck retainer screw is then passed through the bore in the chuck 4 and screwed into the tapped hole in the drive plunger 6 to pull the two parts tightly together. A helical plunger compression spring 34 is slipped around the plunger rod 32. The cylindrical spring container 10 comprises a spring retainer portion 36 having a spring retainer cavity 38 axially formed therein and an integral screw portion 40 with the diameter of the retainer portion being greater than the screw portion 40 as shown in FIG. 3. The plunger compression spring 34 while in position around the plunger rod 32 is slipped into the spring retainer cavity 38 of the spring container 10. The cam sleeve 12 is a hollow cylinder having integral threads formed at one end, two helical slots 42 formed in the wall of said sleeve 12 on opposing sides thereof in spaced parallel relationship, said slots 42 in spaced angular relationship with each other and with the axis of said sleeve 12. At the opposite end of said sleeve 12 from the integral threading a locking portion 44 is formed having an outside diameter greater than the remaining part of the sleeve 12 and having an integral diameter smaller than the remaining part of the sleeve 12 and very slightly greater than a portion of the drive shaft 16. The smaller integral diameter of the locking portion 44 forms an integral shoulder 46 in the sleeve 12 and locking tabs or kegs 48 are formed on the outside periphery of the locking portion 44 to seat in matching apertures in the press bed, not shown, and to hold the sleeve 12 stationary when the assembly 2 is in operation. The solid drive shaft 16 comprises a cylindrical drive column 50 having a dome shaped terminal end 52 and an integral square cutter connecting portion 54 at the opposite end whose width is smaller than the diameter of the remaining portion of the drive column 50 to form a cutter shoulder 56. A drive shaft collar 58 is formed integral with said drive shaft 16 a predetermined distance from the domed end 52, with a diameter greater than the diameter of the drive shaft 16 as shown in FIG. 3. A pin aperture 60 is formed completely through the collar 58 and the drive shaft 16. The cutter connecting portion 54 and a predetermined length of the drive column 50 are tapped centrally along their longitudinal axis. A helical compression spring is engaged around the drive shaft 16 under the drive shaft collar 58 to lie against the shoulder formed by said collar 58. The drive shaft 16 with the compression spring engaged, as heretofore explained, is then dropped into the cavity formed by the walls of the cam sleeve 12 with the cutter connecting portion 54 of the drive shaft 16 extending a predetermined distance beyond the locking portion 44 of the cam sleeve 12 and the compression spring lying between the shoulder of the drive shaft collar 58 and the internal shoulder 46 of the locking portion 44 of the sleeve 12. The sleeve 12 with the compression spring and drive shaft engaged is screwed onto the screw portion 40 of the spring container 4 as best illustrated in FIG. 3. The outside shell 14 comprises a hollow cylinder having two open ends and two spherical slots 62 formed on opposite sides of the wall in spaced right angle relationship to the longitudinal axis of said shell 14. The inner diameter of the shell 14 is slightly greater than the outer diameter of the cam sleeve 12 and the outer diameter of the channel portion 26 of the chuck 4. The outside shell 14 is slipped over the assembled drive shaft 16, the cam sleeve 12, spring container 10 and the channel portion 26 of the chuck 4. Three set screw apertures 64 are tapped in the shell 14 to overlie a part of the channel portion 26 of the chuck 4 and lock screws 8 are screwed into said screw apertures 64. The pin aperture 60 of the drive shaft 16, the helical slots 42 of the cam sleeve 12 and the spherical slots 62 of the shell 14 are lined up and the lock screws 8 are now screwed all the way in to lock the shell 14 firmly to the chuck 4. A pivot pin 66 can now be passed between the walls of the spherical slot 62 and the helical slot 42. The said pin 66 is constructed so that it makes a press fit with the walls of the pin aperture 60 of the collar 58 and the pin 66, when completely engaged, protrudes beyond both sides of the shell 14 as partially shown in FIG. 2.

The cutter 20 comprises a cylindrical cutting portion 68 having a series of cutting teeth 70 in spaced angular relationship with both axes of the cutting portion 68 as shown in FIGS. 1 and 3, and an integral shaft connector portion 72, also cylindrical in shape but of smaller outside diameter than the cutting portion 68. A square aperture 74 is formed completely through the cutter 20. The square cutter connecting portion 54 of the drive shaft 16 is press fitted into the square aperture 74. The cylindrical retaining washer 18 comprises a cutter connecting portion 78 and a retainer portion 80 in which the diameter of the cutter connecting portion 78 is shorter than the retainer portion 80 to form a circumferential shell. The cutter connecting portion 78 of the retaining washer 18 is press fitted into the aperture 74 of the cutter 20 at the opposite end of said cutter 20 from said shaft connector portion 72. The cutter 20 is tapped axially throughout its length. A cutter lock screw 82 having a head whose diameter is greater than the diameter of the aperture tapped in said cutter 20 is screwed through the retaining washer 18, the cutter 20 and into the drive shaft 16 for a predetermined distance to lock the cutter 20 and the washer 18 to the punch assembly 2. The punch 2 is now completely assembled.

To operate the punch assembly 2, the threaded top portion 22 of the chuck 4 is threaded into the spindle of a press. In the preferred embodiment of applicant's device, an eyelet machine (not shown) is used, although through modification not important to applicant's claimed invention any type of press may be used. In the down stroke of the spindle, the locking tabs 48 engage in apertures in the die (not shown) while the cutter 20 has passed a predetermined distance into the blank which has been drawn to the desired height, tapered and pierced. When the locking tabs 48 are engaged with the die, the cam sleeve 12 and the spring container 10 are held immovable for the remainder of the operation. After engagement of the locking tabs 48, the dowel pin 66 must move through the helical slots 42 and the walls of the spherical slots 62 push the said pin 66 downward and at the angle of the helical slots 42 which drives the cutter 20 downward in an angular rotary motion. As the dowel pin 66 moves in its course the plunger compression spring 34 and the helical spring, around the drive column 50 of the drive shaft 16, are tightly compressed and at the bottom of the cutting stroke when downward pressure is released the springs force the parts of the punch assembly back along the same lines they descended in preparation for the next stroke.

It would be a comparatively simple matter to adjust both the helical and spherical slots to impart a skiving which would be substantially circumferential, that is instead of having the skiving mark at an angle to the longitudinal axis of the ferrule, the skiving mark could be made to partially circumscribe the said axis. The steps necessary to create the ferrule 84 are as follows: blank (not shown) is drawn three times to the approximate height of the finished ferrule. It is then tapered and also drawn slightly more to bring it to the exact height of the finished ferrule. The base 86 of the ferrule 84 is then embossed inwardly and in the next step the embossment is pierced along the longitudinal axis. The skiving is then applied and as a final step the ferrule is trimmed to its final contour.

The ferrule itself consists in a cylindrical cup-shaped device having a base 86 and a tapered circumferential wall 88 in integral substantially right angle relationship with said base. The end of said ferrule 84 farthest from the base 86 is open and has a diameter greater than the diameter of the said base 86 as shown in FIGS. 4 and 6. The skivings 90 are of an odd number, in this case 3, and are formed as hereinbefore described so that they are a curl of metal pushed or scraped from the interior of the wall 88, the said curl having a leading edge 92 which on insertion of a wooden dowel, such as a chair leg, will cut into the said wood and will hold the ferrule firmly to the dowel. By making the skiving 90 with an angular cut, greater strength is given it to resist the shearing forces created when the ferrule 84 is applied to the dowel.

Of course, this method of skiving may be used on any cylindrical product which is press formed to prevent the nesting of the parts when they are packed for shipment and during plating and other operations.

Since certain other obvious modifications may be made in this device without departing from the scope of the invention, it is intended that all matter contained herein be interpreted in an illustrative and not in a limiting sense.

We claim:

A tapered nestable article of the class described and of the type having an internal stop element in the form of a helical curl skived from the inner wall of the article to limit the extent of nesting of such articles, the cross-section of which curl is of greater width than the thickness thereof, particularly characterized in that the longitudinal axis of said helical curl is directed at an oblique angle to the longitudinal axis of said tapered article whereby the shearing stress exerted on said curl in the nesting of said articles is distributed over a depth of the material of the curl approaching the width thereof.

References Cited in the file of this patent

UNITED STATES PATENTS

| | | |
|---|---|---|
| 575,806 | Garvey | Jan. 26, 1897 |
| 1,215,804 | Holden et al. | Feb. 13, 1917 |
| 1,987,718 | Smith | Jan. 15, 1935 |
| 2,363,053 | Facks | Nov. 21, 1944 |
| 2,741,833 | Beringer | Apr. 17, 1956 |
| 2,819,557 | Clark | Jan. 14, 1958 |